US005490072A

United States Patent [19]

Hornback

[11] Patent Number: 5,490,072
[45] Date of Patent: Feb. 6, 1996

[54] METHOD AND SYSTEM FOR DETECTING THE PROPER FUNCTIONING OF AN ABS CONTROL UNIT UTILIZING DUAL PROGRAMMED MICROPROCESSORS

[75] Inventor: Edward R. Hornback, Dexter, Mich.

[73] Assignee: Kelsey-Hayes Company, Romulus, Mich.

[21] Appl. No.: 276,344

[22] Filed: Jul. 18, 1994

[51] Int. Cl.⁶ .................................................. B60T 8/88
[52] U.S. Cl. ...................... 364/426.02; 364/184; 364/741
[58] Field of Search .............................. 303/92; 364/426, 364/426.01, 426.02, 184, 550, 266.2, 266.4, 571.05, 737, 741; 180/197

[56] References Cited

U.S. PATENT DOCUMENTS

| | | | |
|---|---|---|---|
| 4,057,299 | 11/1977 | Jones | 303/92 |
| 4,085,979 | 4/1978 | Leiber et al. | 303/92 |
| 4,113,321 | 9/1978 | Bleckmann | 303/92 |
| 4,379,331 | 4/1983 | Watson | 364/426 |
| 4,499,543 | 2/1985 | Matsuda | 364/426 |
| 4,546,437 | 10/1985 | Bleckmann et al. | 364/426.01 |
| 4,701,854 | 10/1987 | Matsuda | 364/426 |
| 4,709,341 | 11/1987 | Matsuda | 364/550 |
| 4,712,841 | 12/1987 | Cage | 303/92 |
| 4,745,542 | 5/1988 | Baba et al. | 364/184 |
| 4,773,072 | 9/1988 | Fennel | 371/11.3 |
| 4,917,443 | 4/1990 | Kramer et al. | 303/92 |
| 5,074,626 | 12/1991 | Kramer et al. | 303/92 |
| 5,193,886 | 3/1993 | Gloceri | 303/92 |
| 5,193,887 | 3/1993 | Bleckmann et al. | 303/92 |
| 5,236,254 | 8/1993 | Müller et al. | 303/92 |

*Primary Examiner*—Kevin J. Teska
*Assistant Examiner*—Russell W. Frejd
*Attorney, Agent, or Firm*—Brooks & Kushman

[57] ABSTRACT

A method and apparatus for detecting the proper functioning of an ABS control unit which utilizes dual programmed microprocessors, the second of which calculates mismatched wheel speed and both of which calculate extended control loop time. When computed wheel velocities are above 10 mph, the second microprocessor determines whether the difference in computed wheel velocity between the two microprocessors is at least 2 mph. If the difference is more than 2 mph for more than 6 consecutive program loops, a mismatched wheel speed calculation error is identified. Each of the microprocessors also compares its loop timing with the loop timing of the other microprocessor and if more than 1 millisecond late for 6 consecutive program loops, the proper diagnostic response is to set an ignition latch code which triggers an inhibit signal. In addition, if the first microprocessor determines more than a 16 millisecond delay, then the first microprocessor is reset. If the second microprocessor determines more than a 65 millisecond delay, then the second microprocessor is reset.

16 Claims, 3 Drawing Sheets

METHOD AND SYSTEM FOR DETECTING THE PROPER FUNCTIONING OF AN ABS CONTROL UNIT UTILIZING DUAL PROGRAMMED MICROPROCESSORS

CROSS-REFERENCE TO RELATED APPLICATION

This application relates to the U.S. patent application Ser. No. 08/280,184 entitled "Method and System for Detecting the Proper Functioning of an ABS Control Unit Utilizing Substantially Identical Programmed Microprocessors", filed on Jul. 25, 1994 and assigned to the same assignee as the present application.

TECHNICAL FIELD

The invention relates to methods and systems for detecting the proper functioning of ABS control units and, in particular, to methods and systems for detecting the proper functioning of ABS control units utilizing dual programmed microprocessors.

BACKGROUND ART

In anti-lock brake systems, it is important to be able to detect if the control unit is properly functioning. A malfunction in the control unit, such as by degradation of a central processing unit (CPU) or clock within a microprocessor, can cause erroneous brake control signals and, hence, improper activation or deactivation of the brakes. Another possible malfunction is the degradation of the signals from a signal converter in the control unit.

To avoid this problem, many anti-lock brake systems now have control units which utilize two separate microprocessors. These two processor designs allow redundant processing of control signals along with the facility to check the accuracy of calculated results. If the two processors disagree as to the value of calculated variables or the state of proper control signals, the control unit can take appropriate steps to disable the system to avoid erroneous operation.

For example, the Bleckmann U.S. Pat. No. 4,113,321, discloses an anti-skid electronic control system having an error detecting circuit. A secondary circuit identical to the primary arithmetic circuits is provided for the anti-skid electronic control system. The outputs of the secondary and primary circuits are connected in a predetermined manner to a comparator arrangement. If an error occurs in the secondary and/or primary circuits, the comparator will detect the error and render the entire anti-skid system inoperable.

The Bleckmann et al U.S. Pat. No. 4,546,437, discloses a method and circuit for controlling a brake slip control apparatus. Valve control signals are produced in at least two independently acting, synchronously driven logical circuit units, which may be integrated circuit configurations, complete "microcontrollers" or single-chip microcomputers, and the signals' waveforms of each of the two circuit units are compared and checked for agreement externally and internally at corresponding locations within the two circuit units. Upon the occurrence of variations in the external and/or the internal signals or the signals' waveform, there will be caused, initiated or prepared a complete or partial disconnection of the brake slip control.

The Fennel U.S. Pat. No. 4,773,072, discloses a method and a circuit configuration for suppressing short term interferences in the processing of data by means of two circuit systems. The circuit systems redundantly process the data and, for the purpose of detecting errors and interferences, between the circuit systems data is exchanged and compared for agreement. If comparators detect differences, the transferred data will be taken over and the data processing will be continued with the transferred data. This takes place in several consecutive cycles. As soon as the predetermined scope or a predetermined number of cycles with differences between the compared data is exceeded, an error will be evaluated and indicated.

The Kramer et al U.S. Pat. No. 5,074,626, discloses an anti-lock brake controller for use in a vehicle anti-lock brake system. The controller includes a main microprocessor and a fail-safe microprocessor of a different type from the main microprocessor, and a device interconnecting the main and fail-safe microprocessors and the remainder of the vehicle braking system so that the fail-safe microprocessor can disable the brake release system independently of the main microprocessor.

The Gloceri U.S. Pat. No. 5,193,886, discloses a wheel speed verification system including an anti-skid control circuit and a method of processor computation confirmation within such an anti-skid control circuit. The confirmation of proper processor operation is done only at a certain one of the computation values. Rotation of a vehicle wheel provides a pulse train, the repetition rate of which is indicative of the vehicle speed. A sequence of program steps is repetitively executed in a microprocessor over a fixed time interval with the microprocessor repeating that same predetermined sequence of program steps during each successive said fixed time interval. A second pulse train is provided having one pulse for each repetition of the sequence of program steps. The speed of at least one vehicle wheel is repetitively computed according to the repetition rate of the first pulse train and the repetition rates of the first and second pulse trains are compared, and corrective action is initiated in the event that the compared repetition rates differ by more than a prescribed amount. The comparison is effected only at a certain specific wheel speed. Alternatively, a computed wheel speed may be compared to the fixed time interval and the anti-skid circuit allowed to continue in operating only so long as the compared wheel speed and time interval are within predetermined limits of one another. Again, the step of comparing is effected only at a certain specific wheel speed.

The Bleckmann et al U.S. Pat. No. 5,193,887, discloses two microcontrollers interconnected by data exchange lines for use in an anti-lock brake system. Signals are concurrently processed by the microcontrollers independently of one another and exchanged signals are checked for consistency. A deviation of the exchanged signals which is due to malfunctions is signalized to a safety circuit which, thereupon, interrupts the power supply to the solenoid valves. A monitoring signal fed to the safety circuit is a predetermined alternating signal in case of consistency of the exchanged signals and in case of proper operation of the circuit configuration. The safety circuit compares the alternating signal with a time standard derived from a clock generator which is independent of the operating cycle of the microcontrollers. A change in the alternating signals, as well as a failure in the time standard, causes a cut-off of power supply and, hence, of anti-lock control.

One of the problems with the prior art is that generally, the prior art is unable to properly handle transient signals which falsely indicate that there is a problem internal to the ABS control unit. Such transient signals may cause the anti-lock brake system to issue an erroneous brake control signal. Also, the prior art generally employs the substantially identical microprocessors which, consequently, increase the expense of the overall system.

SUMMARY OF THE INVENTION

An object of the present invention is to provide a method and system for detecting the proper functioning of a ABS control unit by ignoring transient signals and not permitting them to improperly cause the ABS control unit to issue an erroneous brake control signal in a cost efficient fashion.

In carrying out the above object and other objects of the present invention, in a vehicle anti-lock brake system (ABS), a method is provided for detecting the proper functioning of an ABS control unit having first and second microprocessors. The first microprocessor is programmed with a first program to operate on a first program loop and the second microprocessor is programmed with a second program to operate on a second program loop. The method includes the steps of: a) generating wheel speed signals based on angular speed of each wheel of the vehicle; b) processing the wheel speed signals to obtain a digital representation for each of the wheel speed signals; and c) utilizing the first programmed microprocessor to calculate a first wheel speed during the first program loop based on the digital representation for a particular wheel. The method also includes the steps of: d) utilizing the second programmed microprocessor to calculate a second wheel speed during the second program loop also based on the digital representation for the particular wheel; e) utilizing the second programmed microprocessor to subtract the first and second wheels speeds to obtain a difference value and to compare the difference value with a first predetermined value; and f) repeating steps a)–e) as long as the difference value is greater than the first predetermined value in a first predetermined number of consecutive program loops of the second programmed microprocessor. Finally, the method includes the step of g) utilizing the second programmed microprocessor to generate a first output inhibit signal upon repeating steps a)–e) in the first predetermined number of consecutive program loops.

Preferably, the first and second microprocessors have a different number of bits and the first and second program loops are of equal duration.

Also, preferably, the method includes the steps of h) utilizing the second programmed microprocessor to compare timing of the first program loop with timing of the second program loop to obtain a first delay value and to compare the first delay value with a first predetermined time value; i) repeating step h) in a second predetermined number of consecutive program loops as long as the first delay value is greater than the first predetermined time value; and j) utilizing the second programmed microprocessor to generate a second output inhibit signal on repeating step h) the second predetermined number of consecutive program loops.

The above objects and other objects, features, and advantages of the present invention are readily apparent from the following detailed description of the best mode for carrying out the invention when taken in connection with the accompanying drawings.

BRIEF DESCRIPTION OF THE DRAWING FIGURES

BEST MODE FOR CARRYING OUT THE INVENTION

Figure 1:
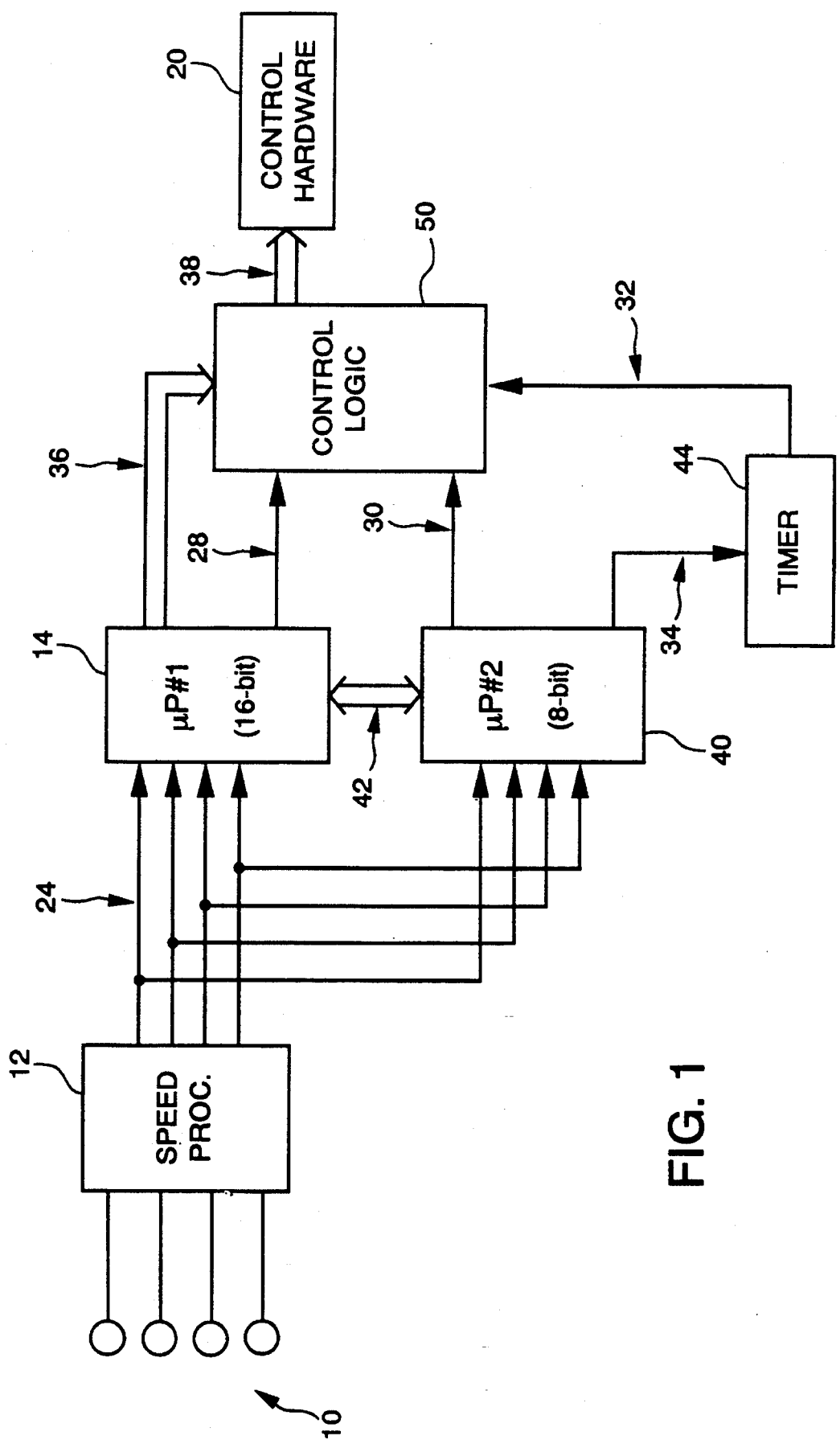
FIG. 1 is a block diagram of the hardware of an ABS control unit of the present invention.

Referring now to the drawing figures, there is illustrated in FIG. 1, an ABS control unit of an anti-lock brake system for carrying out the method and system of the present invention.

In general, ABS diagnostic control algorithms of the present invention are implemented by means of a first microprocessor 14 in conjunction with wheel speed sensors 10, a wheel speed processing circuit 12, control logic 50 and control hardware 20. The wheel speed sensors 10 provide a series of analog pulses whose frequency is proportional to the speed or velocity of the corresponding wheel. The analog output of each of the wheel speed sensors 10 is squared and converted into a corresponding digital pulse train on lines 24 by the speed processor 12. These digital pulse trains are, in turn, fed to the first microprocessor 14.

The first microprocessor 14 is a 16-bit processor which operates based on a five millisecond program loop. During each program loop, the processor 14 calculates a wheel speed for each wheel based on the number of pulse edges received from the speed processor 12 and decides whether it is necessary to generate a control signal on lines 36 to change the control of any of the control hardware 20 via control logic 50. These control signals on lines 36 are fed to the control logic 50 which, if the system is functioning normally, passes corresponding control signals on lines 38 to the control hardware 20. If, however, an inhibit signal is present, on any one of the lines 28, 30 or 32, control signals on lines 38 are generated to return control of the brakes to the master cylinder and ABS activity is ended.

The ABS diagnostic algorithms are also implemented by a second programmed microprocessor 40 which is an 8-bit processor provided to check the operation of the first microprocessor 14. The second microprocessor 40 also operates on a five millisecond program loop and calculates a wheel speed from a selected one of the incoming digital pulse train 24 (the selection of pulse train on lines 24 generally changes with each cycle, such that after four cycles, all four wheel speeds have been selected once). The second microprocessor 40 compares its calculated wheel speed with the corresponding wheel speed provided by first microprocessor 14 over communication lines 42. If the second microprocessor 40 finds that the wheel speed it calculated differs from the wheel speed calculated by first microprocessor 14 by more than 2 mph, it continues to select and compute the speed from this wheel. If the wheel speeds differ in six consecutive loops, an ABS inhibit signal is generated on a line 30.

In executing its five millisecond program loop, the second microprocessor 40 also generates a series of pulses on line 34 at a predetermined frequency. If the second microprocessor 40 stops executing its program loop for any reason, or if it generates pulses at an incorrect frequency due to some malfunction, an ABS inhibit signal is generated on a line 32 by a timer 44.

In addition to the checks described above, each of the microprocessors 14 and 40 checks the timing of the program loop of the other processor. If the first microprocessor 14 determines that the timing of the second microprocessor is late by more than one millisecond for six consecutive loops, an inhibit signal is generated on line 28. Similarly, if the second microprocessor 40 determines that the timing of the first microprocessor 14 is late by more than one millisecond for six consecutive loops, an inhibit signal is generated on the line 30.

Further, if the first microprocessor 14 determines that the timing of the second microprocessor 40 is late by more than 16 milliseconds for a given loop, then the first microprocessor 14 is reset. The first microprocessor 14 then executes a series of power-up tests and starts a new program loop. If the second processor 40 has truly stopped execution of its program loops, the timer 44 will generate an inhibit signal as indicated above.

Similarly, if the second microprocessor 40 determines that the timing of the first microprocessor 14 is late by more than sixty-five milliseconds for a given loop, the second microprocessor 40 is reset. If this condition re-occurs, the second microprocessor 40 waits indefinitely for a response from the first microprocessor 14 and thus, stops executing its program loops, triggering an inhibit signal from the timer 44.

Figure 2:
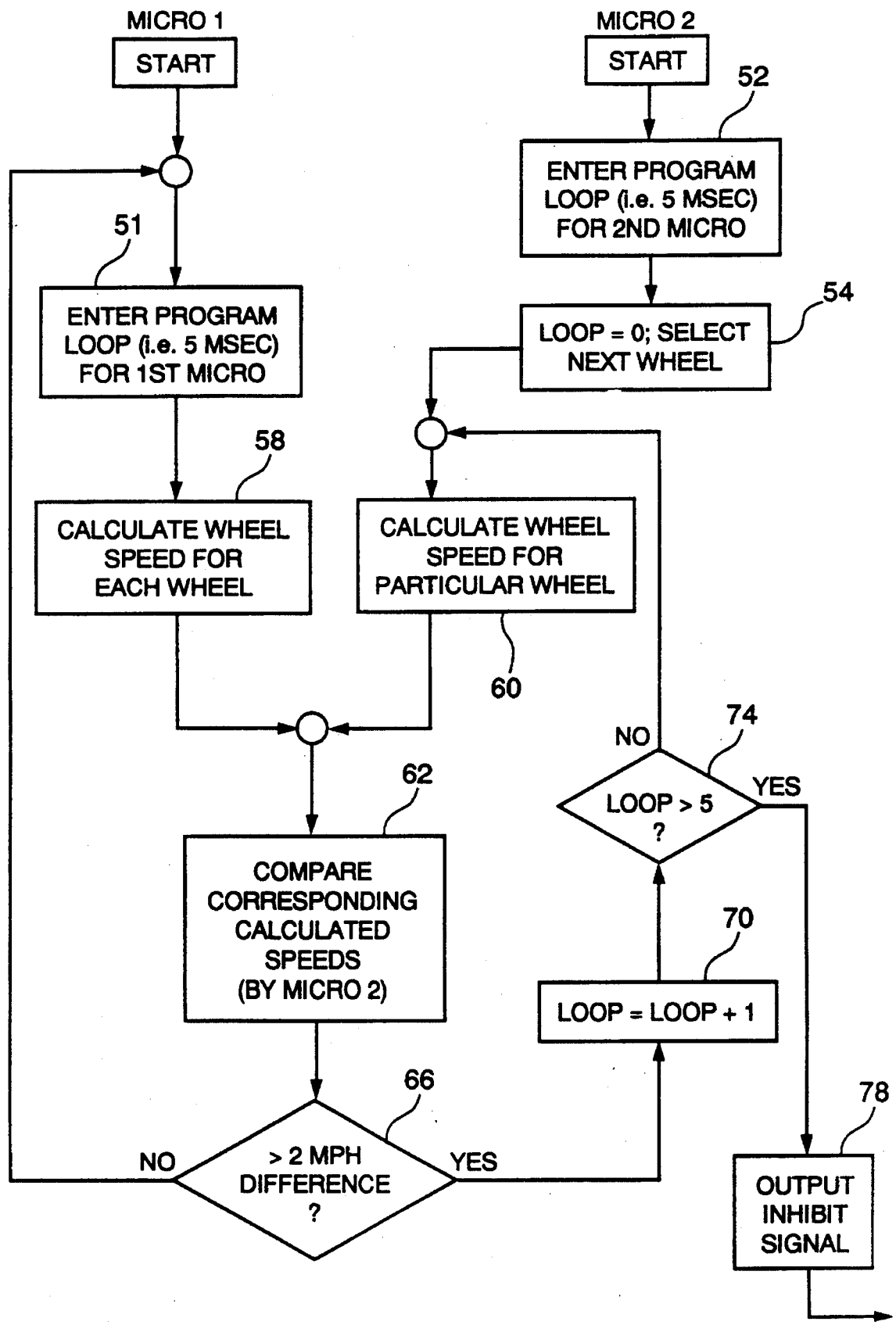
FIG. 2 is a block diagram flow chart of a first diagnostic control algorithm of the present invention.

Referring now to FIG. 2, there is illustrated in block diagram flow chart form, a first diagnostic control algorithm of the present invention. This algorithm determines whether there is a mismatch in the wheel speed calculation performed by the two microprocessors 14 and 40.

Before the algorithm of FIG. 2 is entered, wheel velocity must be above 10 mph. At block 51, the first microprocessor 14 enters its program loop.

At block 52, the second microprocessor 40 enters its program loop.

At block 54, the second microprocessor initializes a variable "loop" to be equal to zero and a particular wheel is selected.

At block 58, the first microprocessor calculates wheel speed for each wheel. In like fashion, at block 60, the second microprocessor calculates a wheel speed for a particular wheel.

At block 62, the second microprocessor 40 compares the wheel speeds calculate by the first microprocessor 14 and the second microprocessor 40.

At block 66, the second microprocessor 40 determines whether the difference in the wheel speeds, if any, is greater than a predetermined speed such as 2 mph.

If the difference in wheel speeds is not greater than 2 mph, program control reverts back to block 51 with respect to the first microprocessor 14.

If the difference in wheel speeds is greater than 2 mph, at block 70, the value of loop is incremented by one with respect to the second microprocessor.

With respect to the second microprocessor, at block 74, if the value of the loop is not greater than a predetermined number such as five, the program control with respect to the second microprocessor, returns to block 60.

However, with respect to the second microprocessor 40, if the value of the loop is greater than five, then at block 78, the second microprocessor outputs an inhibit signal.

The criteria of the first diagnostic control algorithm is that computer wheel velocity be above 10 mph and the difference in computed wheel velocity between the two microprocessors 14 and 40 be at least 2 mph.

Finally, the first two criteria must be present for six consecutive checks spaced 5 milliseconds apart.

The algorithm seeks to deal with problems internal to the ABS control for a module that causes the two microprocessors 14 and 40 to calculate two different speed signals for any given wheel for 30 consecutive milliseconds. One potential problem is the degradation of the signal from the speed processor 12 to either one of the microprocessors 14 or 40 or degradation of a central processing unit (CPU) within either of the microprocessors 14 or 40 and/or the timer bases.

Since the calculated velocities should be identical in both microprocessors 14 and 40 because they are based on a single set of wheel speed signals, an individual calculated wheel speed which is different in each microprocessor by at least 2 mph for 30 consecutive milliseconds causes a mismatched wheel speed calculation error to be identified. A typical diagnostic response is to provide an ignition-latched inhibit signal.

Figure 3:
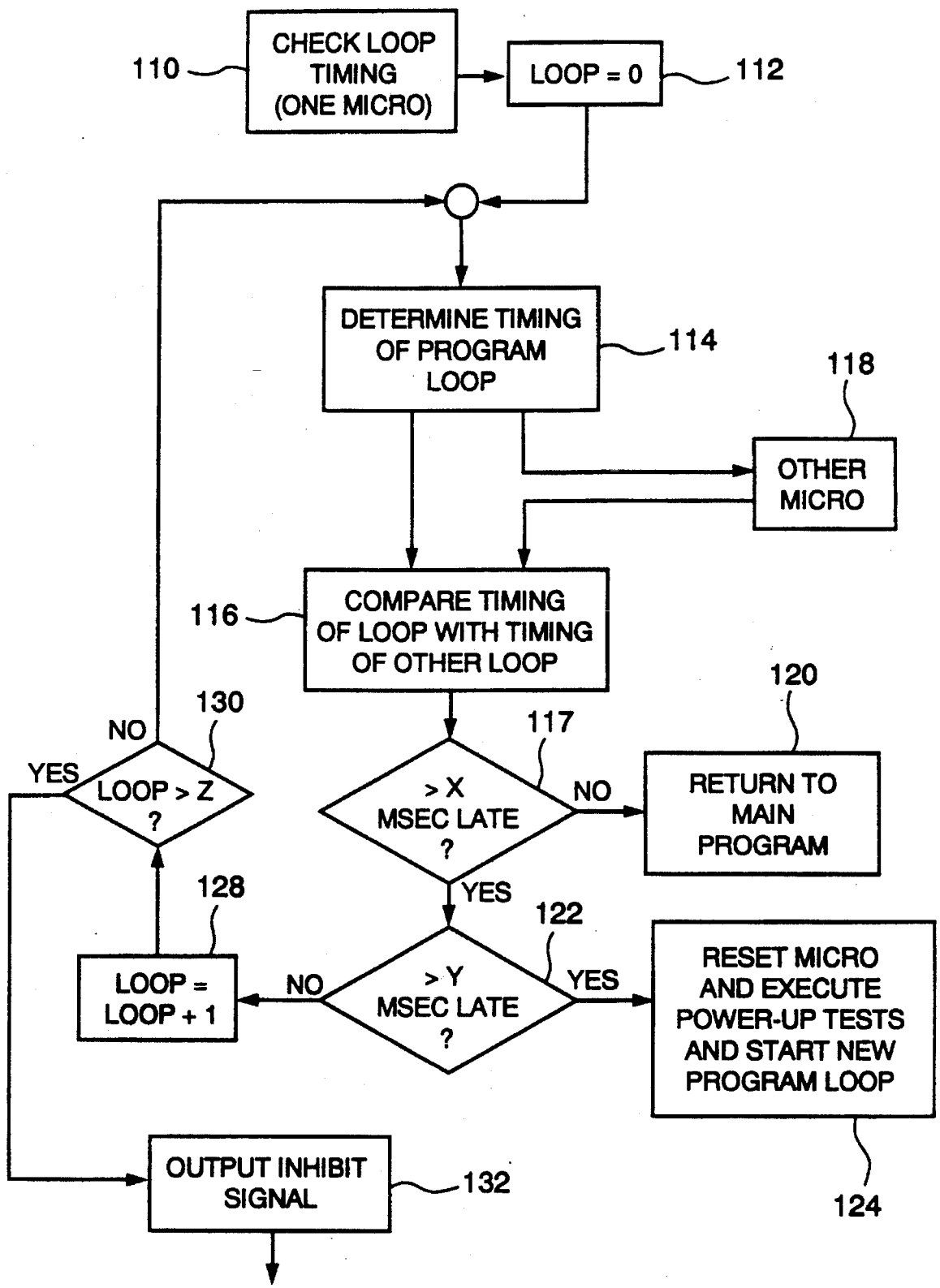
FIG. 3 is a block diagram flow chart of a second diagnostic control algorithm of the present invention implemented on both the first and second microprocessors of the control unit.

Referring now to FIG. 3, there is illustrated in block diagram flow chart form, a second diagnostic control algorithm implemented on both of the first and second microprocessors 14 and 40, respectively. Since the algorithm of FIG. 3 is the same for each of the microprocessors (except where indicated below), the algorithm is only described once hereinbelow.

In general, each microprocessor in the ABS control unit runs a programmed set of instructions that must be finished in a given time frame. This predetermined time frame is called loop time.

The algorithm described in FIG. 3 seeks to compensate for problems internal to the ABS control unit that causes a microprocessor to go beyond its predetermined loop time. This problem may be caused by degradation of the clock of the particular microprocessor or degradation of the central processing unit of the microprocessor.

At block 110 of FIG. 3, the check loop timing of either the first microprocessor 14 or the second microprocessor 40 is entered.

At block 112, the variable "loop" is initialized to be zero.

At block 114, the microprocessor determines the timing of its program loop.

At block 116, the microprocessor compares the timing of its loop with the timing of the loop of the other microprocessor (represented by block 118).

At block 117, the one microprocessor determines whether the timing of the loops is greater than one millisecond late.

If the timing is not greater than one, i.e. a value "x" milliseconds late, the one microprocessor returns to the main program at block 120.

However, if the timing is greater than one millisecond late, the one microprocessor determines whether the timing delay is greater than a value "y" (i.e. 16 milliseconds) late at block 122 if the one microprocessor is the first microprocessor 14. However, if the one microprocessor in the second microprocessor 40 then the one microprocessor determines if the timing delay is greater than 65 milliseconds late at block 122.

At block 124, if the timing is greater than 16 milliseconds late, the one microprocessor resets itself and executes power-up steps and starts a new program loop if the one microprocessor is the first microprocessor 14. If the one microprocessor is the second microprocessor 40 and the timing delay is greater than 65 milliseconds, the second microprocessor 40 resets itself, executes power-up steps and starts a new program loop.

If, however, the one microprocessor determines that the timing delay is not greater than 16 milliseconds late (for the first microprocessor 14 or 65 milliseconds late for the second microprocessor 40), as determined at block 122, at block 128, the variable loop is incremented.

At block 130, the one microprocessor 14 determines whether the variable "loop" is greater than a variable Z which is preferably 6 in value.

If the variable "loop" is not greater than 6 in value, program control reverts back to the block 114.

If the value of the variable "loop" is greater than 6 as determined at block 130, a block 132 is entered wherein the one microprocessor outputs an inhibit signal.

Referring again to FIG. 1, the timer 44 is external to both the microprocessors 14 and 40 and guarantees a return to conventional braking if the microprocessor 40 stops functioning. During normal operation, the control program within the microprocessor 40 toggles an output thereof, thereby sending a square wave to the timer 44. If these pulses stop, timer circuit 44 cuts off a signal to a power relay (not shown) which inhibits operation of all solenoid valves and the pump motor.

In this way, the absence of pulses from the microprocessor 40 causes a condition latched inhibit condition.

Typical causes of such a condition are anything that prevents the pulses from the microprocessor 40 from reaching the timer 44. For example, the microprocessor 40 may malfunction. Other types of malfunctions may be within a clock oscillator circuit, loss of power to the microprocessor 40, an open circuit or a short or ground in the path between the microprocessor 40 and the timer 44.

While the best mode for carrying out the invention has been described in detail, those familiar with the art to which this invention relates will recognize various alternative designs and embodiments for practicing the invention as defined by the following claims.

What is claimed is:

1. In a vehicle anti-lock brake system (ABS), a method for detecting the proper functioning of an ABS control unit having first and second microprocessors, the first microprocessor being programmed with a first program to operate on a first program loop and the second microprocessor being programmed with a second program to operate on a second program loop, the method comprising the steps of:

a) generating wheel speed signals based on angular speed of each wheel of the vehicle;

b) processing the wheel speed signals to obtain a digital representation for each of the wheel speed signals;

c) utilizing the first programmed microprocessor to calculate a first wheel speed during the first program loop based on the digital representation for a particular wheel;

d) utilizing the second programmed microprocessor to calculate a second wheel speed during the second program loop also based on the digital representation for the particular wheel;

e) utilizing the second programmed microprocessor to subtract the first and second wheels speeds to obtain a difference value, and to compare the difference value with a first predetermined value;

f) repeating steps a)–e) as long as the difference value is greater than the first predetermined value in a first predetermined number of consecutive program loops of the second programmed microprocessor; and g) utilizing the second programmed microprocessor to generate a first output inhibit signal upon repeating steps a)–e) in the first predetermined number of consecutive program loops wherein the first output inhibit signal prevents the ABS control unit from issuing an erroneous brake control signal.

2. The method as claimed in claim 1 wherein the first and second microprocessors have a different number of bits.

3. The method as claimed in claim 2 wherein the first and second program loops are of equal duration.

4. The method as claimed in claim 1 further comprising the steps of:

h) utilizing the second programmed microprocessor to compare timing of the first program loop with timing of the second program loop to obtain a first delay value and to compare the first delay value with a first predetermined time value;

i) repeating step h) in a second predetermined number of consecutive program loops as long as the first delay value is greater than the first predetermined time value; and j) utilizing the second programmed microprocessor to generate a second output inhibit signal on repeating step h) the second predetermined number of consecutive program loops.

5. The method as claimed in claim 4 further comprising the step of resetting the second programmed microprocessor if the first delay value is greater than a second predetermined time value which is greater than the first predetermined time value during any of the consecutive program loops.

6. The method as claimed in claim 5 further comprising the steps of:

k) utilizing the first programmed microprocessor to compare timing of the second program loop with the timing of the first program loop to obtain a second delay value and comparing the second delay value with a third predetermined time value;

l) repeating step k) in a third predetermined number of consecutive program loops as long as the second delay value is greater than the third predetermined time value; and m) utilizing the first programmed microprocessor to generate a third output inhibit signal on repeating step k) the third predetermined number of consecutive program loops.

7. The method as claimed in claim 6 further comprising the step of resetting the first programmed microprocessor if the second delay value is greater than a fourth predetermined time value which is greater than the third predetermined time value during any of the consecutive program loops.

8. The method of claim 7 wherein the first and third predetermined time values are identical, and the fourth predetermined time value is at least twice as large as the second predetermined time value.

9. In a vehicle anti-lock brake system (ABS), apparatus for detecting the proper functioning of an ABS control unit, the apparatus comprising:

means for generating wheel speed signals based on angular speed of each wheel of the vehicle;

means for processing the wheel speed signals to obtain a digital representation for each of the wheel speed signals;

a first microprocessor programmed with a first program to operate on a first program loop to calculate a first wheel speed during the first program loop based on the digital representation for a particular wheel;

a second microprocessor programmed with a second program to operate on a second program loop to calculate a second wheel speed during the second program loop also based on the digital representation for the particular wheel, wherein the second programmed microprocessor is programmed to subtract the first and second wheels speeds to obtain a difference value and to compare the difference value with a first predetermined value, and wherein if the difference value is greater than the first predetermined value for a first predetermined number of consecutive program loops, the second programmed microprocessor generates a first output inhibit signal wherein the first output inhibit signal prevents the ABS control unit from issuing an erroneous brake control signal.

10. The apparatus as claimed in claim 9 wherein the first and second microprocessors have a different number of bits.

11. The apparatus as claimed in claim 10 wherein the first and second program loops are of equal duration.

12. The apparatus as claimed in claim 9 wherein the second microprocessor is further programmed to compare timing of the first program loop with timing of the second program loop to obtain a first delay value and to compare the first delay value with a first predetermined time value in a second predetermined number of consecutive program loops as long as the first delay value is greater than the first predetermined time value and wherein the second microprocessor is programmed to generate a second output inhibit signal when the first delay value is greater than the first predetermined time value for the second predetermined number of consecutive program loops.

13. The apparatus as claimed in claim 12 further comprising means for resetting the second programmed microprocessor if the first delay value is greater than a second predetermined time value which is greater than the first predetermined time value during any of the consecutive program loops.

14. The apparatus as claimed in claim 13 wherein the first microprocessor is programmed to compare timing of the second program loop with timing of the first program loop to obtain a second delay value and to compare the second delay value with a third predetermined time value in a third predetermined number of consecutive program loops as long as the second delay value is greater than the third predetermined time value and wherein the first microprocessor is programmed to generate a third output inhibit signal when the second delay value is greater than the third predetermined time value for the third predetermined number of consecutive program loops.

15. The apparatus as claimed in claim 14 further comprising means for resetting the first programmed microprocessor if the second delay value is greater than a fourth predetermined time value which is greater than the third predetermined time value during any of the consecutive program loops.

16. The apparatus of claim 15 wherein the first and third predetermined time values are identical, and the fourth predetermined time value is at least twice as large as the second predetermined time value.

* * * * *